UNITED STATES PATENT OFFICE.

CHARLES S. LOCKWOOD, OF ALBANY, NEW YORK, ASSIGNOR TO THE BONSILATE COMPANY, (LIMITED,) OF SAME PLACE.

PROCESS OF RENDERING SILK PLASTIC BY HEAT AND PRESSURE.

SPECIFICATION forming part of Letters Patent No. 305,204, dated September 16, 1884.

Application filed January 29, 1883. (Specimens.)

*To all whom it may concern:*

Be it known that I, CHARLES S. LOCKWOOD, a citizen of the United States, residing at Albany, in the county of Albany and State of New York, have invented certain new and useful Improvements in Process of Rendering Silk Plastic by Heat and Pressure; and I do hereby declare the following to be a full, clear, and exact description of the invention, such as will enable others skilled in the art to which it appertains to make and use the same.

The invention relates to the action of heat and pressure on silk and to a new product resulting therefrom, as hereinafter more fully described.

The invention is based upon the discovery that silk, in the form of a fabric or any other form, may be welded by heat and pressure. If the silk is in the form of a fabric, the effect of the application of the heat and pressure is to cause it to become compressed and solidified, at the same time producing, if the die or mold is properly polished, a very dense and glossy surface. When the invention is practiced in this way—that is to say, in connection with silk that has been made into a fabric—the result will probably be utilized chiefly in its application in the nature of a veneering, inlaying, facing, wrapping, or covering upon other materials for various purposes in the arts, as will be understood by persons conversant therewith. If preferred, the silk will be employed in other forms. It may be reduced to a flock or powder, or small pieces of thread and the like may be utilized, the precise shape or character of the particles being a matter of secondary importance.

I have been able to produce particularly fine results with yellow silk from Naples, the formula of which is: fiber, 53.40; glue-yielding matter, 20.65; wax, resin, and fatty matter, 1.50; coloring-matter, 0.05; albumen, 24.40.

Finely-comminuted inert materials may, if desired, be added to the silk in suitable proportions.

I contemplate especially the action of heat and pressure on silk when in the form of a fabric, in which I have been very successful. I have been able, also, to secure good results when the fabric has been only partially of silk.

In practicing the invention I take any kind or quality of silk which I see fit and apply the heat and pressure in any desired way, not limiting myself to any particular method. I have obtained very satisfactory results by cutting a piece of silk of a size adapted to be pressed in a die having a polished surface or surfaces. The piece or blank of silk having been placed in the die, the die has been heated to a temperature due to about eighty pounds of steam, more or less, the pressure being about two tons to the square inch. By this means I have been enabled to completely transform the character of the silk, producing a compressed and solidified material quite unlike any other material of which I have a knowledge.

It will be found that if the silk be ornamented in any way the ornamentation will be preserved without appreciable injury, the compression being fully effected without impairing the finest lines or effects.

In the employment of the silk with plastic material, the material may be placed in the lower section of a die or mold, and then a piece of silk of any desirable form or design placed upon it, after which the whole is subjected to heat and pressure, the result being that the silk will be firmly combined with the plastic material, and if the piece of silk is smaller than the surface of the article to be produced it will be pressed into the material as an inlay. The silk becomes plastic and unites with the plastic material when under heat and pressure. Any desirable kinds of plastic materials may be made use of—such as bonsilate or celluloid.

Any preferred color may be given to the silk prior to its being introduced into the die, according to the effect it is desired to produce and the uses to which the material is to be applied. The effect of the heat and pressure on the silk, besides agglutinating it, is to destroy the capillary attraction and make a waterproof material, and to render the fabric stiff and flexible. No difficulty will be experienced in molding the silk, under conditions which will effect its agglutination, into embossed and other shapes, as well as into sheets and bulk pieces.

The invention being based on the discovery that silk is of such a nature that it can be agglutinated or welded by means of heat and pressure, I do not limit my claim to the treatment of any particular kind of silk or to the application of heat and pressure in any particular way; but

What I claim as new is—

1. An article consisting, essentially, of silk agglutinated by heat and pressure.

2. A veneer, coating, inlay, or wrapping consisting of silk in the form of a fabric agglutinated by heat and pressure.

3. An article in which the adhesive properties of silk are used for purposes of agglutination.

4. A stiff flexible water-proof fabric consisting, essentially, of silk agglutinized by pressure in heated dies.

5. The process of utilizing silk to produce a new product which consists in agglutinating the same by pressure in heated dies.

In testimony whereof I affix my signature in presence of two witnesses.

CHAS. S. LOCKWOOD.

Witnesses:
CHAS. C. GILL,
HERMAN GUSTOW.